United States Patent [19]

Pakosh

[11] 4,117,849

[45] Oct. 3, 1978

[54] ROTARY COMBINE

[75] Inventor: Daniel Pakosh, Winnipeg, Canada

[73] Assignee: Versatile Manufacturing Ltd., Winnipeg, Canada

[21] Appl. No.: 724,986

[22] Filed: Sep. 20, 1976

[51] Int. Cl.² .................................................. A01F 12/18
[52] U.S. Cl. .................................. 130/27 Q; 56/14.6; 130/27 F; 130/27 H
[58] Field of Search ............ 56/14.6; 130/30 H, 27 R, 130/27 P, 27 Q, 27 H, 27 F

[56] References Cited

U.S. PATENT DOCUMENTS

| | | | |
|---|---|---|---|
| 1,082,609 | 12/1913 | Scott | 130/30 H |
| 2,320,945 | 6/1943 | Maginn | 130/27 H |
| 3,169,357 | 2/1965 | Suzue | 130/27 P |
| 3,430,633 | 3/1969 | Mark | 130/27 R |
| 3,946,746 | 3/1976 | Decoene | 56/14.6 |

FOREIGN PATENT DOCUMENTS 166,380   12/1955   Australia .................................. 130/27 P

*Primary Examiner*—Jay N. Eskovitz
*Attorney, Agent, or Firm*—Stanley G. Ade

[57] ABSTRACT

Swathed grain is picked up by a conventional pick-up and fed into the side of one end of a transversly situated rotary impeller assembly which moves the crop in a spiral motion against threshing grates on the lower portion and spiral fins on the upper portion. The crop reaches the other end of the impeller assembly and is transferred to one end of a second transversly situated rotary impeller assembly whereupon the action is repeated until the crop reaches the other end of the second assembly whereupon the crop with the majority of grain removed, is discharged at right angles to the axis of the impeller assembly and into a final beater assembly. The threshed and separated grain falls from the impeller assemblies to a grain pan and is cleaned by two sieve assemblies which extend the full width of the impeller assemblies. Unthreshed grain is returned to a re-threshing unit mounted at one end of the beater. The crop is threshed by a flailing action and separated centrifugally as it passes through the impeller assembly.

18 Claims, 5 Drawing Figures

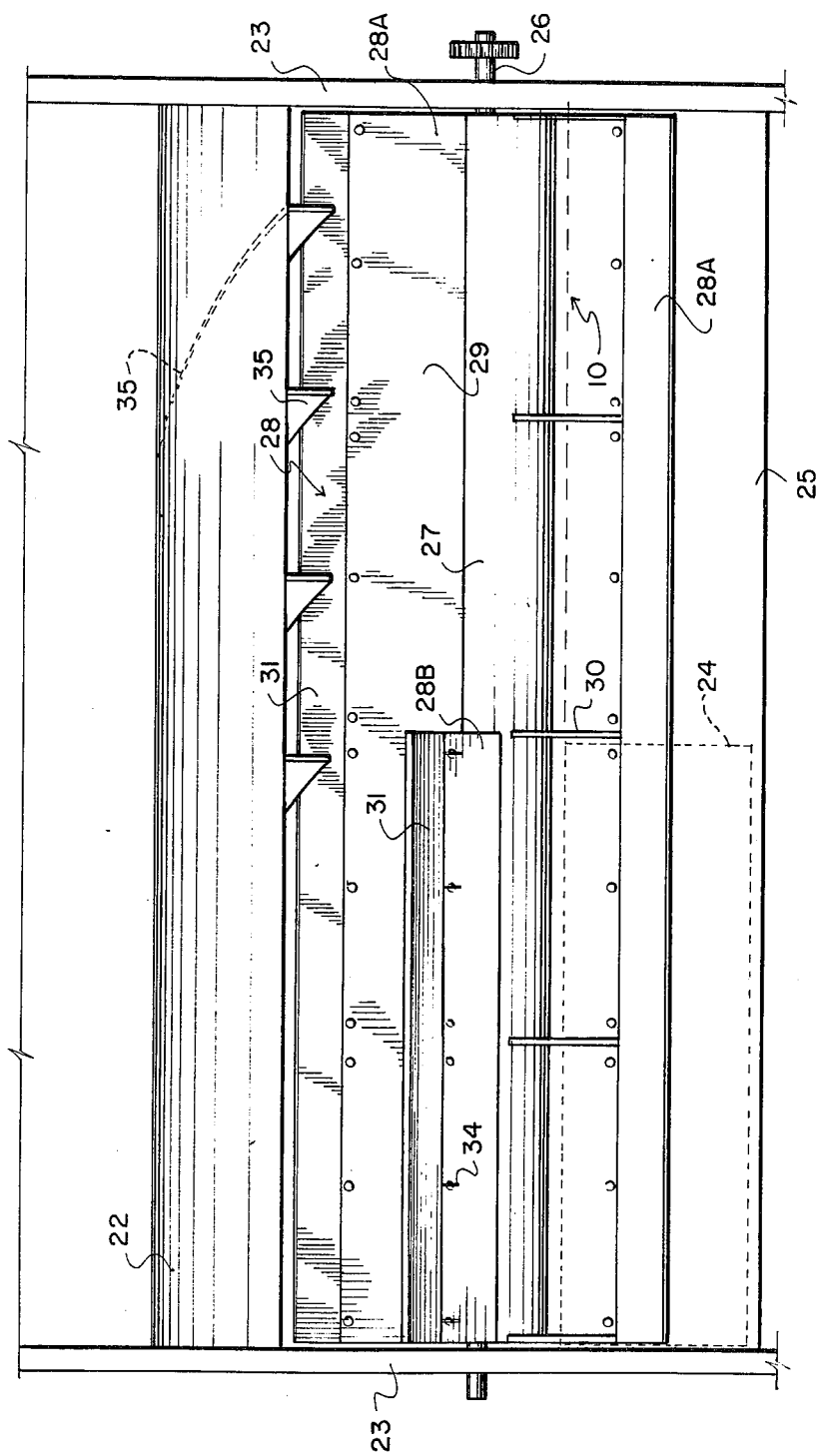

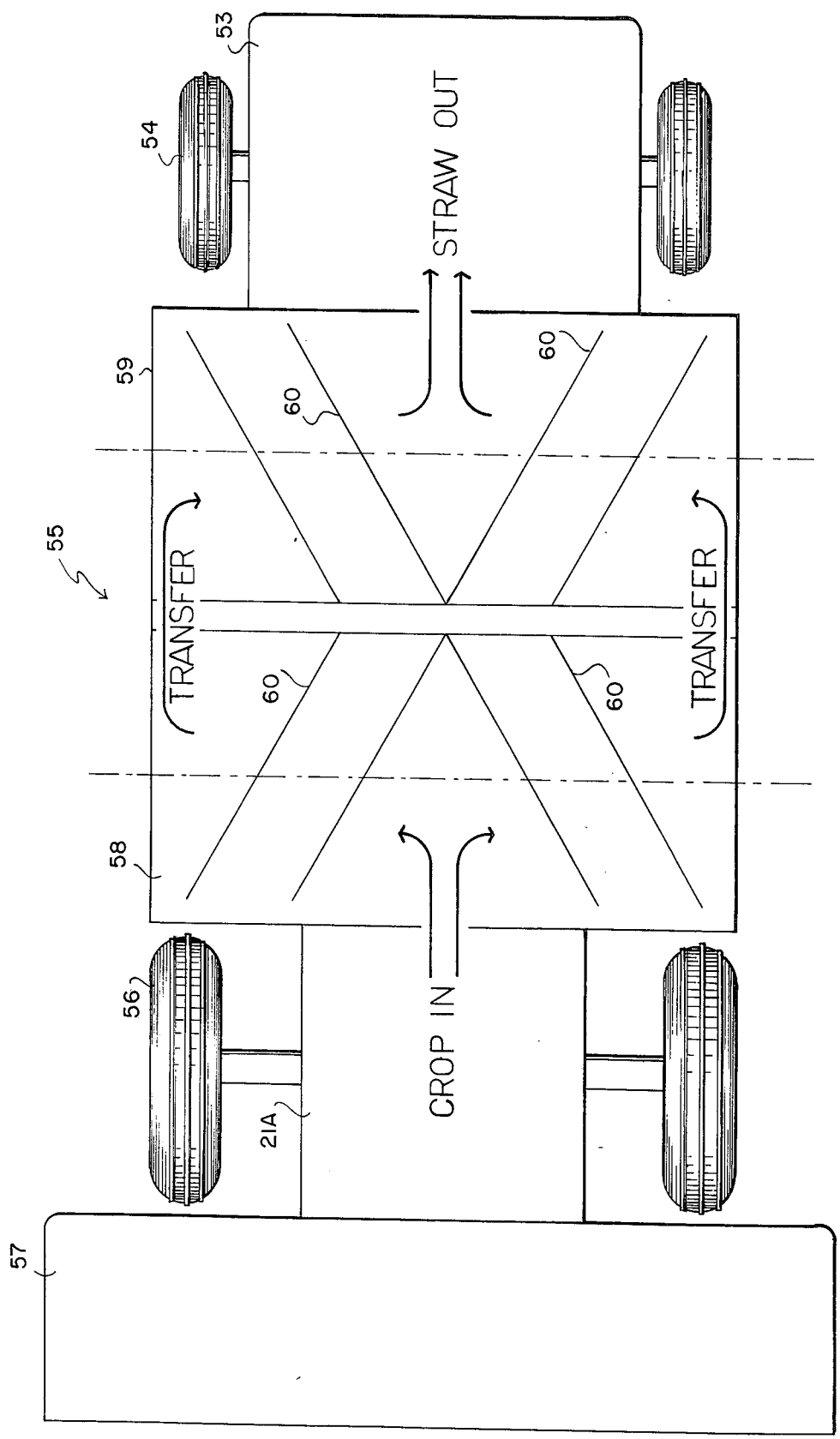

ROTARY COMBINE

BACKGROUND OF THE INVENTION

This invention relates to new and useful improvements in rotary combines.

The majority of rotary combines include longitudinally extending cylindrical threshing units with various means to feed the crop through the threshing assemblies so that grain is separated and falls through grates to be further treated therebelow.

The majority of these units still maintain the threshing cylinder concept which leads to cracked and split grain as well as slowing down the combine speed, particularly when heavy crop conditions are encountered.

Furthermore, in order to obtain sufficient length of threshing action to separate the grain satisfactorily, such cylinders have to be of a considerable length making the construction of the combine difficult and the resultant machine relatively unwardly unwiedly and difficult to operate and transport.

SUMMARY OF THE INVENTION

The present invention overcomes all of these disadvantages firstly by providing a rotary combine which threshes the grain by a flailing action rather than by the conventional concave cylinder assembly and secondly, by providing a pair of threshing cylinders situated transversely of the machine and in side by side relationship.

This permits the necessary length of threshing cylinder by providing a significant improvement with respect to the elimination of cracked and broken grain as compared with conventional units based on the threshing cylinder and concave concept.

A transfer port is situated at one end of the pair of cylinders so that grain is transferred from one to the other and spiralling fins are incorporated which moves the crop from the intake to the transfer port and from the transfer port to a discharge port of the second assembly.

The spacing and angle of the spiral fins ensures that the crop passes over the threshing grates several times as it passes from one end of each assembly to the other so that an extremely efficient threshing action is obtained and sufficient length is provided. Furthermore, due to the diameter and length of the assemblies, the combine is not required to slow down when heavy crop conditions are met as the capacity is such to permit the threshing of heavy crops.

The principal object and essence of the invention is therefore to provide a rotary combine of the character herewithin described in which the grain is threshed by a flailing action of paddles beating the grain and in which the grain is separated due to this threshing action and passes through grates formed in the bottom of the threshing assemblies.

Another object of the invention is to provide a device of the character herewithin described in which the crop is thrown outwardly towards the cylindrical casings by centrifugal force so that it engages the stationary spiral fins which moves the crop from one end of each of the assemblies to the other and then transfers the crop from one assembly to the other.

A still further object of the invention is to provide a device of the character herewithin described in which the crop is fed into one of the assemblies at right angles to the axis of rotation of the assemblies and is transferred from one assembly to the other at right angles to the axis of rotation and finally is discharged at right angles to the axis of rotation of the assembly.

A still further object of the invention is to provide a device of the character herewithin described which includes a final beater assembly and a re-threshing assembly to ensure full separation of the grain from the crop passing through the device.

Another object of the invention is to provide a device of the character herewithin described which, due to the construction thereof, permits relatively wide grain sieve assemblies to be utilized for conventional separation of grain and chaff after it has been separated from the crop by the threshing assemblies.

Yet another object of the invention is to provide a device of the character herewithin described which, due to the construction thereof, forms a relatively compact, easily manoeuverable machine which requires less horsepower than a conventional combine handling the same quantity of crop and at the same speed.

Yet another object of the invention is to provide a device of the character herewithin described which is relatively simple in construction, economical in manufacture and otherwise well suited to the purpose for which it is designed.

With the foregoing objects in view, and other such objects and advantages as will become apparent to those skilled in the art to which this invention relates as this specification proceeds, my invention consists essentially in the arrangement and construction of parts all as hereinafter more particularly described, reference being had to the accompanying drawings in which:

DESCRIPTION OF THE DRAWINGS

FIG. 4 is a fragmentary front elevation of the threshing assembly per se.

FIG. 5 is a schematic plan view of an alternative embodiment of the invention.

In the drawings like characters of reference indicate corresponding parts in the different figures.

DETAILED DESCRIPTION

Figure 1:
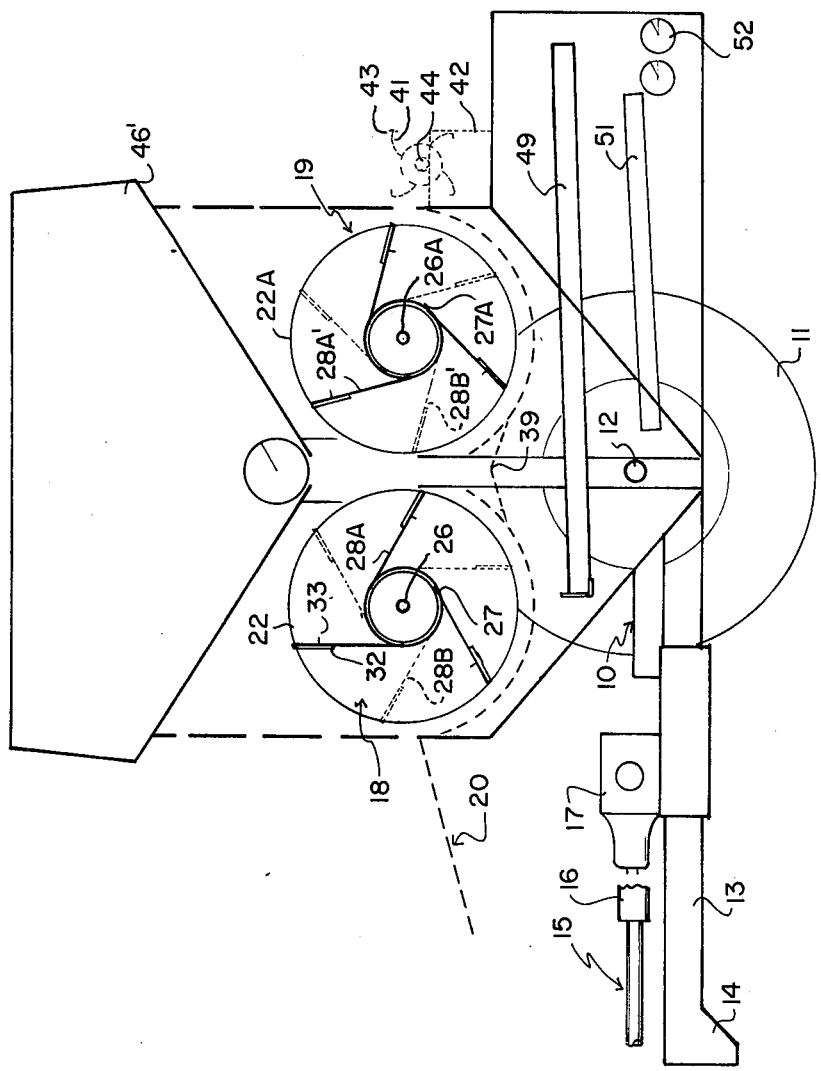
FIG. 1 is a side elevation of the combine sectioned in part to show the interior thereof.

Proceeding therefor to describe the invention in detail, reference character 10 illustrates general supporting framework mounted upon a pair of ground engaging wheels 11 which in turn are journalled upon a transverse axle assembly 12.

A hitch component 13 extends forwardly from one side of the framework and terminates in a hitch clevis 14 by which the device may be secured to a powered vehicle such as a tractor (not illustrated).

The tractor also supplies power through its power take-off, to a drive shaft 15 situated just above the hitch assembly 13, which is connected to a universal joint 16 at a gear box assembly 17.

Figure 2:
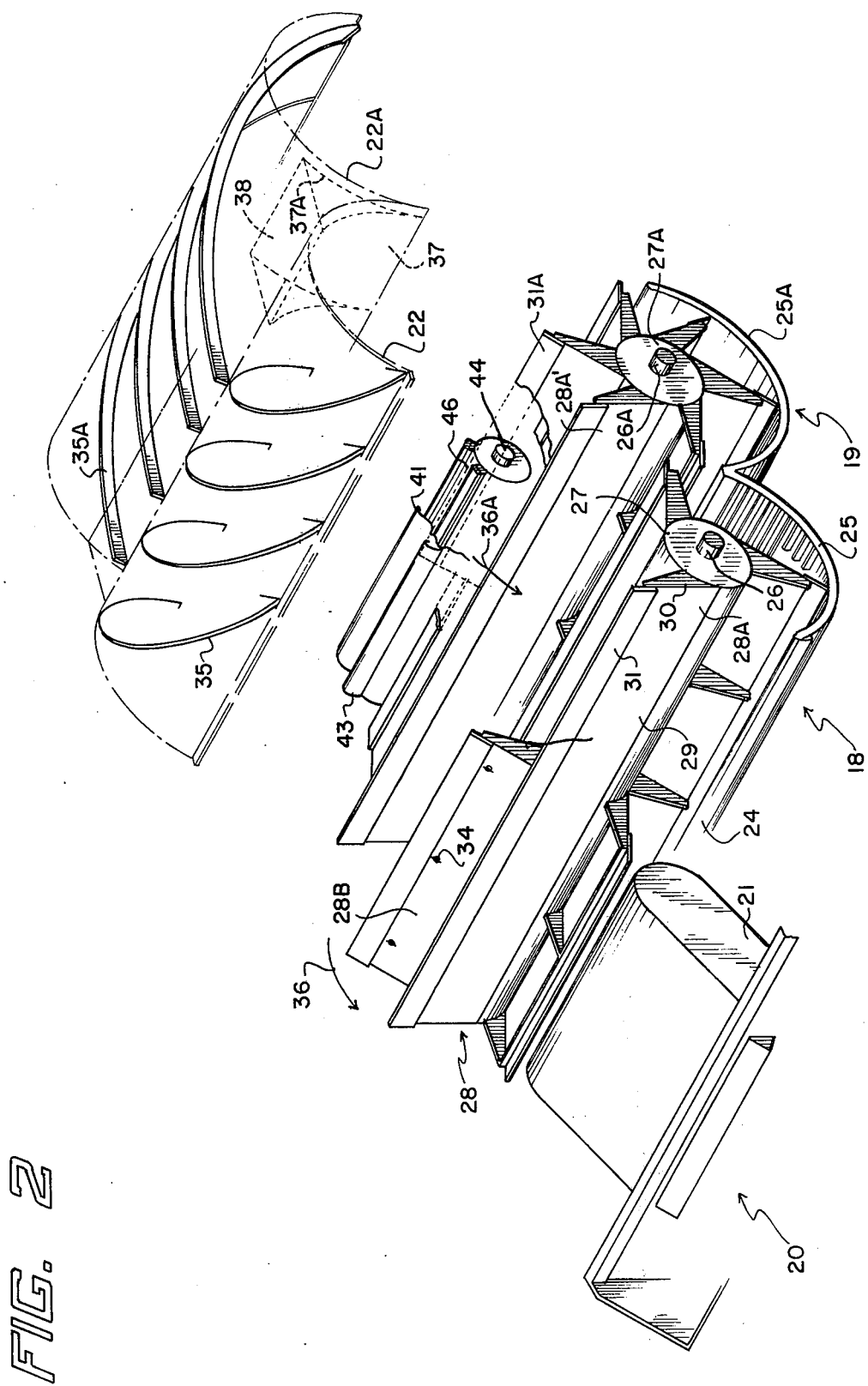
FIG. 2 is a fragmentary schematic partially exploded isometric view of the crop pick-up and threshing assembly portion of the device.
Figure 3:
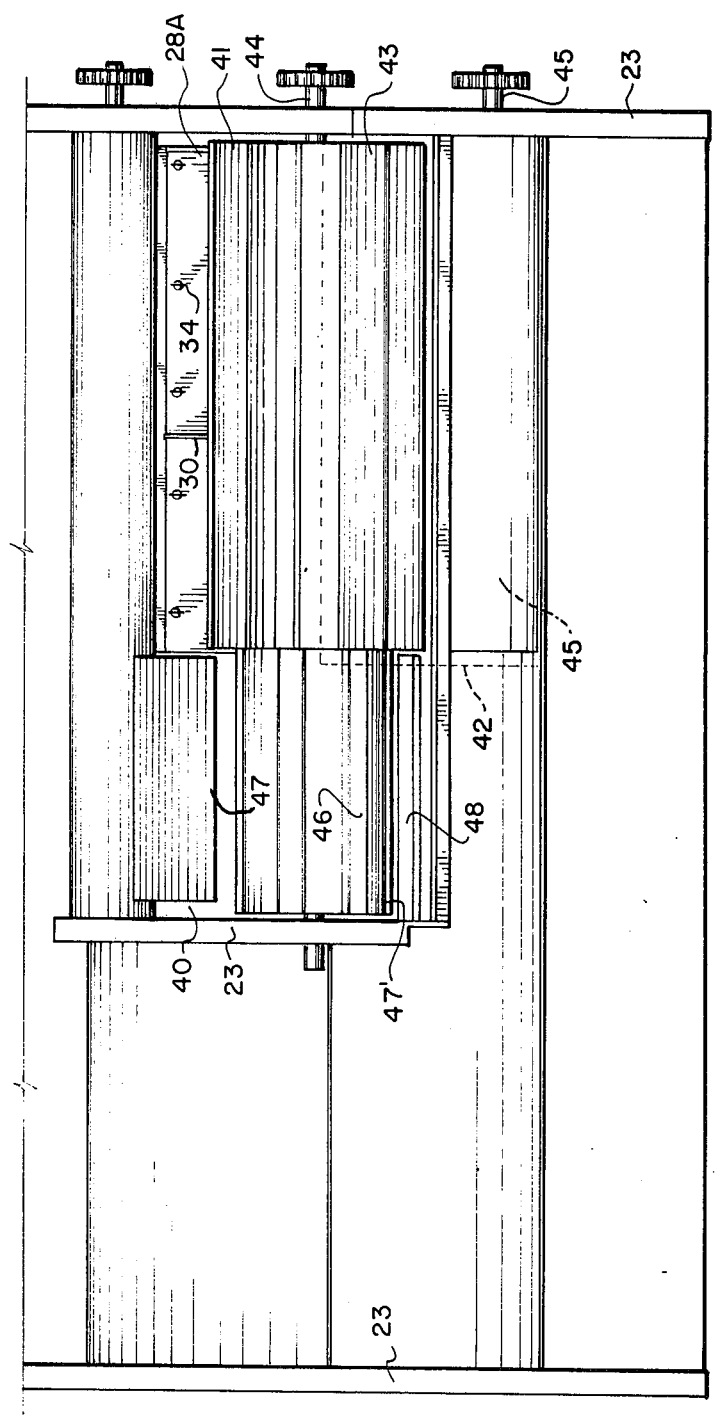
FIG. 3 is a rear view of the device with the part of casing removed for clarity.

Situated transversely of the supporting framework 10, is a front rotary impeller assembly collectively designated 18 and a rear rotary impeller assembly collectively designated 19, both assemblies being situated adjacent one another as clearly illustrated in FIGS. 1 and 2.

A conventional crop pick-up assembly collectively designated 20 is supported upon the front of the supporting framework and as the construction is conventional, it is not believed necessary to describe same further.

However, this pick-up assembly conveys swath crop to an inclined conveyor assembly 21 which is also conventional in construction and which in turn discharges this picked up crop into the intake of the front rotary impeller assembly 18.

The front rotary impeller assembly 18 comprises a substantially cylindrical casing 22 supported within the framework and including end panels 23. This casing is provided with an entrance aperture 24 adjacent one end thereof. The lower portion of the casing is provided with thresing grates 25 through which threshed grain may pass as will hereinafter be described.

Journalled for rotation within the end walls 23 of this casing 22, is a shaft 26 supporting a cylindrical drum 27 and a plurality of beater blades or paddles collctively designated 28, are secured to the periphery of this drum and extend radially therefrom.

In the present embodiment, there are two sets of paddles, a first set comprising three blades or paddles specifically designated 28A and which extend from one end of the drum to the other, and a second set specifically designated 28B which extend from the intake end of the drum to a position substantially half way therealong and it will be observed that these blades or paddles of this second set 28B, alternate with the blades or paddles of the first set 28 as clearly shown in FIG. 2.

Each of the blades or paddles of both sets 28A and 28B, include the main support plate 29 braced to the drum by means of gussets 30 and having rubber or similar resilient outer edge portions 31 adjustably secured to the plates 29. One method is shown of adjustably securing these edges 31 to the plates 29 and comprises an inner portion 32 with nut and bolt assemblies 33 extending through elongated slots 34 formed in the plate 29.

This adjustment is required so that the overall diameter of the beater assemblies can be adjusted within limits and to ensure that the edges of the blades or paddles do not rub against the grates 25.

Spaced and parallel spiral fins or blades 35 are secured to the inner surface of the top portion of the casing 22 as clearly shown in FIG. 2 and these consist of flat strips extending at right angles to the inner surface and spiralling as shown so that if the beater assembly rotates in the direction of arrow 36, the crop which is thrown by centrifugal force onto the casing, is spiralled along from the intake end to the other end of the casing as will hereinafter be described.

Adjustment of the resilient edges 31 is provided, similar to that hereinbefore described, so that these edges do not rub against the inner edges of the spiral strips 35 but are spaced slightly therefrom. This together with the spacing of the edges from the threshing grates, eliminates any chance of broken or cracked grain from occurring.

The rear rotary impeller assembly 19 is similar in construction to the front assembly 18 so that the similar numbers have been given to the corresponding parts. However, it should be noted that reference characters 28A and 28B of the front assembly have been indicated by reference characters 28A' and 28B' in the rear assembly.

The rear assembly rotates in the same direction as the front assembly as indicated by reference character 36A but it will be noted that the spiral strips or fins 35A, incline in the opposite direction so that whereas crop travels from left to right (with reference to FIG. 2) in the front assembly 18, it travels from right to left (with reference to FIG. 2) in the rear assembly 19.

Transfer means are provided between adjacent ends of the two assemblies 18 and 19 and two structural embodiments are shown in FIGS. 1 and 2.

In FIG. 2, the rear edge of the right-hand end of the threshing grates 25 is contiguous with the front edge of the right-hand end of the grate 25A and cut-out portions 37 and 37A are formed in the corresponding portions of the upper casing parts 22 so that when the upper portions of the casings are engaged upon the threshing grate portions of the casing, a transfer port is formed between the two assemblies 18 and 19, at right angles to the axis of rotation of the assemblies and a horizontal plate 38 encloses the upper side of this transfer port.

In FIG. 1, the portions of the threshing grate which form the lower edge of the transfer port between the two assemblies, are cut away and straightened so that these two portions join at a common locus 39 in order to form the lower edge of the transfer point.

Part of the rear of the casing of the rear assembly, is cut away at the opposite end to the transfer port, to form a discharge 40 and crop that is discharged at this point, enters a beater assembly 41 partially enclosed within a casing 42 situated at the rear of the machine.

This beater assembly consists of a plurality of resilient beater blades or paddles 43 mounted upon a shaft 44 journalled for rotation within the side plates 23 and this ensures final separation of the grain from the straw being discharged from the rear assembly 19.

The straw is discharged upon the ground behind the combine in the usual way and the grain from the beater assembly 41 drops downwardly to a pick-up auger assembly 45 which conveys it to a grain reservoir or bin 46' situated above the assemblies 18 and 19 and extending transversely of the supporting framework.

However, as such conveying methods are well known, it is not believed necessary to describe same further.

A re-threshing cylinder assembly 46 is also mounted upon shaft 44 to one side of the beater paddles 43 and any grain heads which pass through the combine and the sieves, are returned to a seed chute 47 situated above the re-threshing cylinder assembly. This re-threshing cylinder assembly includes rubber threshing bars, a conventional concave 47' and a grate 48 and operates in the conventional manner.

Grain threshed from the crop passing through the assemblies 18 and 19, falls through the threshing grates 25 and 25A and onto an upper sieve assembly 49 shown schematically in FIG. 1 and situated between the two assemblies and it will be appreciated that this sieve assembly extends the full width of the combine.

Air separation is provided by means of a fan not shown connected to the power take-off 15 so that chaff is blown from the grain on the sieve deck 49. The grain is picked up by a conventional auger assembly (not illustrated) and conveyed to the grain tank or reservoir 46'.

A second sieve assembly 51 is situated below the first sieve assembly and also includes a source of air for cleaning purposes not illustrated. Once again any further chaff is separated and the grain conveyed to the tank 46' in the conventional manner.

Any heads passing over the sieves are picked up by a transverse auger assembly shown schematically by reference character 52 and conveyed to the aforementioned re-threshing assembly 23 via the feed 47.

However, as this portion of the assembly is conventional, it is not believed that further details are required.

Summarizing, threshed crop is picked up by the pick-up assembly 20 and transferred by conveyor 21 to the intake 24 of the front assembly 18 whereupon the rotor throws it by centrifugal force against the inside of the casing 22 whereupon it is spiralled towards the right-hand end of FIG. 2 by the fins 35. At the same time, the blades or paddles 28A and 28B flail the grain from the crop and the grain falls through the threshing grates 25 for further treatment by the sieves 49 and 51.

The crop is then transferred to the rear of assembly 19 whereupon the sequence is repeated and the crop from which the grain has now been removed, is discharged and is finally treated by the rear beater assembly 41.

Any unthreshed heads are fed back to the rethreshing assembly 46 and all grain, after it has been cleaned by the sieves, is conveyed to the grain tank or reservoir 46' situated above the assemblies 18 and 19.

The flailing action and the use of the rubber edges 31 on the paddles, prevents cracked grain from occurring.

This system of threshing by two rotary impeller assemblies requires less power and as the crop moves through the combine in a spiral motion, it passes the threshing grates four or five times in a swath the width of the conveyor housing 21.

The additional set of blades 28B adjacent the intake 24 of the front assembly 18 and the intake of the rear assembly 19, assist in feeding the grain into the assemblies and flailing the grain from the grain heads within the crop picked up by the pick-up 20.

The drive from the gear box 17 is conventional and is shown in phantom in FIG. 1. However, there are many methods of driving the various components of the combine so that specific details are not provided.

FIG. 5 shows a schematic plan view of an alternative embodiment of the combine which, in this instance, is illustrated as a self-propelled combine.

The previous embodiment is illustrated as being designed as a pull-type combine. However, in both the original embodiment and the embodiment shown in FIG. 5, the design can readily be adapted for use as a self-propelled comgine or a pull-type combine as desired.

In FIG. 5, reference character 53 shows the front end of the source of power mounted upon wheels 54 and having the rotary combine generally illustrated by reference character 55, being situated forwardly of the wheels 54 and between wheels 54 and front wheels 56, all of which is supported on general supporting framework (not illustrated).

An auger table 57 is situated forwardly of the wheels 56 and an elevator 21A conveys the threshed crop from the auger table, to the rotary combine 55.

This rotary combine 55 also includes a pair of rotary impeller assemblies 58 and 59 mounted transversely of the machine.

The vertical elevator, in this embodiment, is connected to the center of the casing of the rotary impeller assembly 58 between the ends thereof centrally, and the drum (not illustrated in this embodiment) is journalled for rotation within the assembly and is provided with beater blades secured to and extending substantially radially from the drum in a manner hereinbefore described with the exception that the beater blades are oppositely handed upon each side of the longitudinal center line 59 of the assembly. The overhead deflectors or stationary fins 60, in this embodiment, are also directed in opposite directions on either side of the center line so that they, together with the beater blades, divide the crop entering the drum, into two parts, one moving towards one end of the assembly and the other moving towards the other end of the assembly.

The beating and threshing action is the same and when the crop reaches the ends of the assembly 58, crop transfer means are provided at each end, similar to the crop transfer means hereinbefore described, which directs the crop into the other rotary impeller assembly 59, which is similar in construction to rotary impeller assembly 58 with the exception that the beater blades and the stationary fins 60 are inclined in opposite directions so that the two halves of the crop are then fed towards the center of the assembly 59 whereupon they are discharged through the drum wall centrally thereof between the ends of the assembly 59 at which time they pass through a final beater assembly and a re-threshing assembly (if necessary) similar to those hereinbefore described.

Summarizing, the crop enters the first assembly 58 centrally thereof and through the side wall whereupon it is divided so that part of the crop moves towards one end of the assembly and part towards the other, being threshed as it passes towards the end whereupon it is transferred to the second assembly 59 and, after further threshing, moves towards the center of this further assembly 59 whereupon it is discharged centrally from the wall and at right angles thereto.

Both of the embodiments described, allow threshing of a wide variety of crops without adjustments to the machines and without adjusting the clearance between the beaters and the lower threshing grates. Various crops and straw conditions are accommodated by varying the speed of the beater or rotary impeller assemblies so that the machine is much more simple to operate than combines or threshing devices now in use.

Since various modifications can be made in my invention as hereinabove described, and many apparently widely different embodiments of same made within the spirit and scope of the claims without departing from such spirit and scope, it is intended that all matter contained in the accompanying specification shall be interpreted as illustrative only and not in a limiting sense.

What I claim as my invention is:

1. A rotary combine which includes a wheel mounted supporting framework, crop pick-up means and means to connect the combine to a source of power such as a tractor or the like; said combine comprising in combination a pair of rotary impeller assemblies mounted transversely of the supporting framework, means operatively connecting said crop pick-up means to the side of one end of one of said rotary impeller assemblies whereby said crop enters said one rotary impeller assembly at right angles to the rotary axis of said rotary impeller assembly, crop transfer means at the other end of said one said rotary impeller assembly operatively connecting said other end of said one rotary impeller assembly with one end of said other rotary impeller assembly whereby said crop leaves said one rotary impeller assembly and enters said other rotary impeller assembly at right angles to the axis of rotation of said rotary impeller assemblies and discharge means at the other end of said second rotary impeller assembly whereby said crop leaves said other rotary impeller assembly at right angles to the axis of rotation of said other rotary impeller assembly, each of said rotary impeller assemblies including means to thresh said crop and separate grain therefrom, and threshing grates in the bases of said rotary impeller assemblies through which grain passes which is separated from said crop, each of said rotary impeller assemblies including a transversely extending substantially cylindrical casing, a drum journalled for rotation within each said casing, a plurality of beater blades secured to and extending substantially radially from said drum, and extending in a continuous manner from one end of said drum to the other, each beater blade lying parallel to the longitudinal axis of said drum and a plurality of spaced and parallel stationary fins secured to the upper portion of each of said casings, said fins in conjunction with said beater blades, moving said crop spirally from said one end of said drum towards the other ends thereof.

2. The combine according to claim 1 in which the outer edges of said beater blades are resilient and are spaced from said fins and from said threshing grates, and means to adjust the distance between said outer edges of said beater blades and said fins and said threshing grates.

3. The combine according to claim 1 in which said beater blades include a first set of blades extending the full length of said drum and a second set of blades extending from said one end of said drum to a position intermediate the ends of said drum, said blades of said second set alternating with said blades of said first set.

4. The combine according to claim 2 in which said beater blades include a first set of blades extending the full length of said drum and a second set of blades extending from said one end of said drum to a position intermediate the ends of said drum, said blades of said second set alternating with said blades of said first set.

5. The combine according to claim 1 which includes a combination beater assembly and re-threshing assembly situated adjacent said discharge means, said beater assembly including a drum, a plurality of beater blades extending radially from said drum and a shaft mounting said drum for rotation, said drum lying parallel to said rotary impeller assembly, a casing surrounding said beater drum, said casing including a lower threshing grate portion, said re-threshing assembly including a threshing cylinder mounted on said shaft and a casing surrounding said cylinder, said casing including a lower threshing grate portion.

6. The combine according to claim 2 which includes a combination beater assembly and re-threshing assembly situated adjacent said discharge means, said beater assembly including a drum, a plurality of beater blades extending radially from said drum, and a shaft mounting said drum for rotation, said drum lying parallel to said rotary impeller assembly, casing surrounding said beater drum, said casing including a lower threshing grate portion, said re-threshing assembly including a threshing cylinder mounted on said shaft and a casing surrounding said cylinder, said casing including a lower threshing grate portion.

7. The combine according to claim 3 which includes a combination beater assembly and re-threshing assembly situated adjacent said discharge means, said beater assembly including a drum, a plurality of beater blades extending radially from said drum, and a shaft mounting said drum for rotation, said drum lying parallel to said rotary impeller assembly, a casing surrounding said beater drum, said casing including a lower threshing grate portion, said re-threshing assembly including a threshing cylinder mounted on said shaft and a casing surrounding said cylinder, said casing including a lower threshing grate portion.

8. The combine according to claim 4 which includes a combination beater assembly and re-threshing assembly situated adjacent said discharge means, said beater assembly including a drum, a plurality of beater blades extending radially from said drum, and a shaft mounting said drum for rotation, said drum lying parallel to said rotary impeller assembly, a casing surrounding said beater drum, said casing including a lower threshing grate portion, said re-threshing assembly including a threshing cylinder mounted on said shaft and a casing surrounding said cylinder, said casing including a lower threshing grate portion.

9. In a rotary combine, a front rotary impeller assembly extending transversely of said combine and a rear rotary impeller assembly also extending transversely of said combine and situated adjacent said front rotary impeller assembly, crop feeding means conveying crop to the side of one end of said front rotary impeller assembly whereby said crop enters at right angles to the rotary axis of said front rotary impeller assembly, discharge means at the rear side of the same end of said rear rotary impeller assembly discharging threshed crop at right angles to the rotary axis of said rear rotary impeller assembly, and transfer means at the other ends of said rotary impeller assemblies whereby crop is transferred from said front rotary impeller assembly to said rear rotary impeller assembly at right angles to the rotary axis of rotary impeller assemblies, each of said rotary impeller assemblies including means to thresh crop and separate grain therefrom, threshing grates in the lower portions of said rotary impeller assemblies through which grain passes that has been separated from said crop, each of said rotary impeller assemblies including a transversely extending substantially cylindrical casing, a drum journalled for rotation within each said casing, a plurality of beater blades secured to and extending substantially radially from said drum, and extending in a continuous manner from one end of said drum to the other, each beater blade lying parallel to the longitudinal axis of said drum and a plurality of spaced and parallel stationary fins secured to the upper portion of each of said casings, said fins in conjunction with said beater blades, moving said crop spirally from said one end of said drum towards the other end thereof.

10. The combine according to claim 9 in which the outer edges of said beater blades are resilient and are spaced from said fins and from said threshing grates, and means to adjust the distance between said outer edges of said beater blades and said fins and said threshing grates.

11. The combine according to claim 9 in which said beater blades include a first set of blades extending the full length of said drum and a second set of blades extending from said one end of said drum to a position intermediate the ends of said drum, said blades of said second set alternating with said blades of said first set.

12. The combine according to claim 10 in which said beater blades include a first set of blades extending the full length of said drum and a second set of blades extending from said one end of said drum to a position intermediate the ends of said drum, said blades of said second set alternating with said blades of said first set.

13. The combine according to claim 9 which includes a combination beater assembly and re-threshing assembly situated adjacent said discharge means, said beater assembly including a drum, a plurality of beater blades extending radially from said drum and a shaft mounting said drum for rotation, said drum lying parallel to said rotary impeller assembly, a casing surrounding said beater drum, said casing including a lower threshing grate portion, said re-threshing assembly including a threshing cylinder mounted on said shaft and a casing surrounding said cylinder, said casing including a lower threshing grate portion.

14. The combine according to claim 10 which includes a combination beater assembly and re-threshing assembly situated adjacent said discharge means, said beater assembly including a drum, a plurality of beater blades extending radially from said drum and a shaft mounting said drum for rotation, said drum lying parallel to said rotary impeller assembly, a casing surrounding said beater drum, said casing including a lower threshing grate portion, said re-threshing assembly including a threshing cylinder mounted on said shaft and a casing surrounding said cylinder, said casing including a lower threshing grate portion.

15. The combine according to claim 11 which includes a combination beater assembly and re-threshing assembly situated adjacent said discharge means, said beater assembly including a drum, a plurality of beater blades extending radially from said drum and a shaft mounting said drum for rotation, said drum lying parallel to said rotary impeller assembly, a casing surrounding said beater drum, said casing including a lower threshing grate portion, said re-threshing assembly including a threshing cylinder mounted on said shaft and a casing surrounding said cylinder, said casing including a lower threshing grate portion.

16. The combine according to claim 12 which includes a combination beater assembly and re-threshing assembly situated adjacent said discharge means, said beater assembly including a drum, a plurality of beater blades extending radially from said drum and a shaft mounting said drum for rotation, said drum lying parallel to said rotary impeller assembly, a casing surrounding said beater drum, said casing including a lower threshing grate portion, said re-threshing assembly including a threshing cylinder mounted on said shaft and a casing surrounding said cylinder, said casing including a lower threshing grate portion.

17. A rotary combine which includes a wheel mounted supporting framework, crop pick-up means and means to connect the combine to a source of power such as a tractor or the like; said combine comprising in combination a pair of rotary impeller assemblies mounted transversely of the supporting framework, means operatively connecting said crop pick-up means to the side wall of one of said rotary impeller assemblies whereby crop enters said one rotary impeller assembly at right angles to the rotary axis of said rotary impeller assembly, crop transfer means in said one rotary impeller assembly operatively connecting said one rotary impeller assembly with the other said rotary impeller assembly through the side wall of said other rotary impeller assembly and at right angles to the rotary axis of said other rotary impeller asssembly, and discharge means in said other rotary impeller assembly whereby said crop leaves said other rotary impeller assembly at right angles to the axis of rotation of said other rotary impeller assembly, each of said rotary impeller assemblies including means to thresh said crop and separate grain therefrom, and threshing grates in the bases of said rotary impeller assemblies through which grain passes which is separated from said crop, each of said rotary impeller assemblies including a transversely extending substantially cylindrical casing, a drum journalled for rotation within each said casing, a plurality of beater blades secured to and extending substantially radially from said drum, and extending in a continuous manner from one end of said drum to the other, each beater blade lying parallel to the longitudinal axis of said drum and a plurality of spaced and parallel stationary fins secured to the upper portion of each of said casing, said fins in conjunction with said beater blades, moving said crop spirally from where said crop enters said rotary impeller assembly towards where said crop leaves said rotary impeller assembly.

18. The combine according to claim 17 in which said crop pick-up means is connected to the side wall of said one rotary impeller centrally between the ends thereof, said crop transfer means being situated at each end of said one rotary impeller assembly, said discharge means being situated centrally between the ends of said other rotary impeller assembly.

* * * * *